(12) United States Patent
Reed et al.

(10) Patent No.: US 7,534,299 B2
(45) Date of Patent: May 19, 2009

(54) METHOD AND APPARATUS FOR SPRAYING TRUSSES WITH A MOLD AND INSECT PREVENTATIVE SOLUTION

(75) Inventors: Michael E. Reed, Lakeland, FL (US); David E. Reed, Lakeland, FL (US); Dale Collins, Lakeland, FL (US)

(73) Assignee: Rhino Hide LLC, Lakeland, FL (US)

( * ) Notice: Subject to any disclaimer, the term of this patent is extended or adjusted under 35 U.S.C. 154(b) by 836 days.

(21) Appl. No.: 11/018,517

(22) Filed: Dec. 20, 2004

(65) Prior Publication Data

US 2005/0153076 A1  Jul. 14, 2005

Related U.S. Application Data

(60) Provisional application No. 60/531,033, filed on Dec. 18, 2003.

(51) Int. Cl.
 *B05B 13/06* (2006.01)
 *B05B 1/28* (2006.01)

(52) U.S. Cl. .................. 118/326; 118/314; 118/315; 118/316

(58) Field of Classification Search .............. 118/304, 118/313–316, 325, 326, 500, 501; 144/332, 144/347, 213, 242.1, 243, 3.1, 250.13; 427/345, 427/421.1, 325, 440, 441; 29/897.31, 281.3, 29/281.5; 269/910, 37, 305
See application file for complete search history.

(56) References Cited

U.S. PATENT DOCUMENTS

| | | | | | |
|---|---|---|---|---|---|
| 2,206,179 | A | * | 7/1940 | Frank | 118/316 |
| 4,213,420 | A | * | 7/1980 | Martino | 118/713 |
| 5,092,028 | A | * | 3/1992 | Harnden | 29/709 |
| 5,934,347 | A | * | 8/1999 | Phelps | 144/347 |

\* cited by examiner

*Primary Examiner*—Yewebdar T Tadesse
(74) *Attorney, Agent, or Firm*—Gray Robinson, P.A.

(57) ABSTRACT

A spray box assembly including, in combination, a top spray box, a bottom spray box, the boxes being juxtapositioned to define a pathway therebetween, at least one spray assembly positioned within at least one of the boxes and a supply assembly for supplying a treating solution to the spray assembly to coat product with the treating solution as the product is fed through the pathway and also including a method of coating a product with a treating solution, comprising the steps of feeding the product into a pathway between top spray box and a bottom spray box and spraying the treating solution within at least one of the boxes about the pathway to coat the product with the treating solution as the product is fed through the pathway.

9 Claims, 7 Drawing Sheets

METHOD AND APPARATUS FOR SPRAYING TRUSSES WITH A MOLD AND INSECT PREVENTATIVE SOLUTION

CROSS REFERENCE TO RELATED APPLICATIONS

This application claims the benefit of provisional application 60/531,033 filed Dec. 18, 2003, the disclosure of which is hereby incorporated by reference herein.

BACKGROUND OF THE INVENTION

1. Field of the Invention

This invention relates to a method and apparatus for spraying lumber such as trusses with a mold and insect preventative solution.

2. Description of the Background Art

Presently, various pesticides, insecticides and mold preventative solutions exist for spraying lumber and other products. Prior art methods for treating lumber include dipping, pressure-treating, and vacuum treating. Unfortunately, however, treating lumber in bulk results in considerable waste of the treating solutions.

More particularly, treating an un-manufactured products such as a bundle of lumber results in a significant loss of treated lumber when the treated lumber is subsequently used. Specifically, during the building of a structure, lumber is cut to the designed lengths. The scrap lumber is then simply discarded. The amount of treating solution that was consumed during the treating process for the scrap lumber is therefore wasted. Moreover, scrap wood that has been treated by prior art solutions are sometimes unusable for a recycling plant or other scrap-wood company.

One current method of externally applying treating solution utilizes a conventional hand pump sprayer. However, due to considerable overspray, hand spraying is wasteful of treating solution.

Therefore, it is an object of this invention to provide an improvement which overcomes the aforementioned inadequacies of the prior art devices and provides an improvement which is a significant contribution to the advancement of the mold and insect preventative art.

Another object of this invention is to provide an apparatus and method for applying treating solution to lumber that has been already cut and assembled into a manufactured product such as a truss.

Another object of this invention is to provide an apparatus and method for applying treating solution to lumber that has been already cut and assembled into a manufactured product such as a truss such that scrap lumber therefrom may be recycled thereby eliminating treating solution waste.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing this invention, this invention comprises an apparatus and method for applying a liquid treating solution onto all surfaces of a manufactured truss to prevent mold growth thereon, decay of wood by insects or other degradation of the wood as determined by the treating characteristics of the treating solution.

Importantly, all of the treating solution that does not penetrate into the wood of the truss as it passes through the apparatus is collected in a tank below the spraying applicators. The treating solution is then continuously circulated from the tank to the spraying applicators.

The recirculation process of the invention has two major advantages over spraying by hand with a hand pump sprayer. The most significant advantage over an individual hand pump sprayer is that the treating solution is continuously recirculated and none of it is lost to overspray. The second advantage is the time saved spraying the entire truss in one sweep instead of spraying each separate board by hand.

The spraying apparatus and method of the invention also has an advantage over the other forms of treating methods. Dipping, pressure, and vacuum treatments are all too costly and time consuming. These treatments commonly require that the whole board be treated. Then, when the board to cut to size for a manufactured truss design, a lot of scrap wood is leftover. The treating solution previously used to treat the scrap wood is lost, resulting in unnecessary costs. Furthermore, the treating solution may cause the scrap wood to become unusable or unrecyclable. Finally, some treating solutions require an incubation time after being treated, which could cause further delays before the treated lumber could be used in the manufacturing of a truss.

The apparatus and method of the present invention is most advantageously used for coating roof and floor trusses with a treating solution which will prevent mold growth and decay from wood destroying organisms. As noted above, according to the subject invention, a manufactured truss, preferably immediately after it is rolled through a press, it passes through the spraying apparatus wherein the treating solution is be sprayed onto every surface of the truss to penetrate the wood itself. This method of applying a treating solution to trusses is designed to eliminate waste, save time, and save money.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
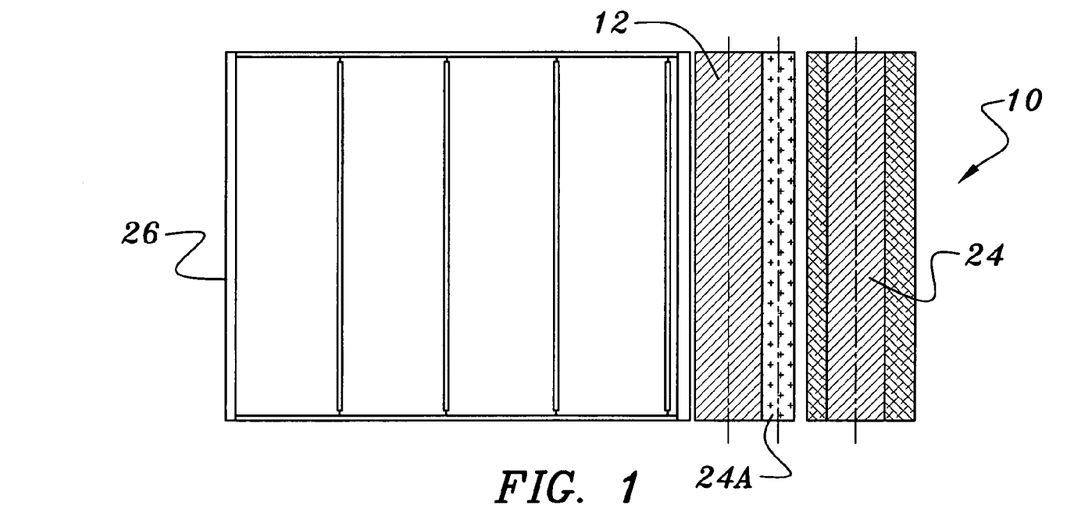
FIG. 1 is a top plan view of the spray box assembly of the invention showing the roller press at the input thereof from which the pressed and assembled trusses are then fed through the spray box assembly and onto a roller table.
Figure 2:
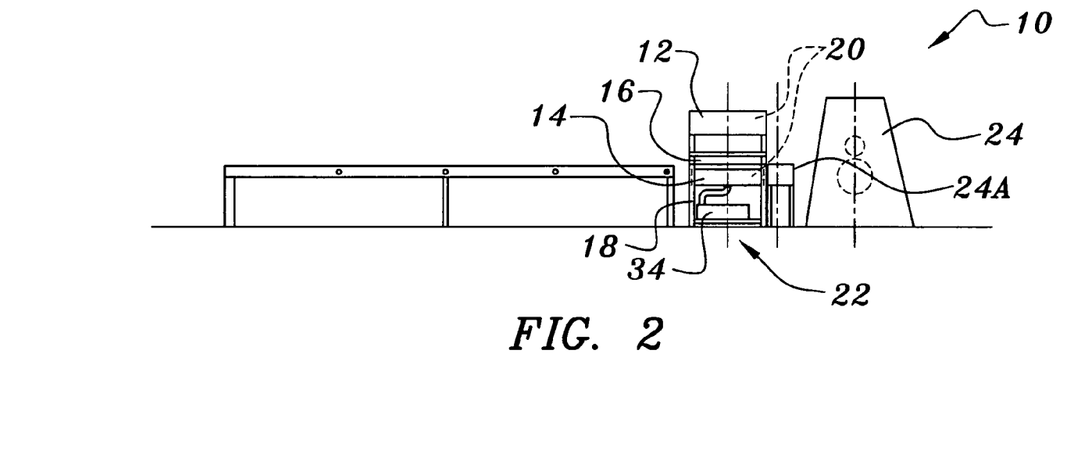
FIG. 2 is a front plan view of FIG. 1 showing the uniform elevational path of the trusses as they pass through the roller press, through the sprayer box and onto the roller table.

As best shown in FIGS. 1 and 2, the invention 10 comprises a top spray box 12 juxtapositioned above a bottom spray box 14 by means of a metal frame 16 supported by legs 18 so as to define a pathway between the boxes 12 & 14. The spray boxes 12 and 14 each contain spray assemblies 20 supplied with a suitable insecticide, pesticide or mold preventative treating solution from a supply assembly 22 positioned underneath the bottom box 14. A conventional roller press 24 with a slide table 24A is aligned with the input of the pathway. Similarly, a conventional roller table 26 is aligned with discharge of the pathway.

In operation, the roof truss with its placed assembly brackets is fed through the roller press 24 to press the brackets into the truss. The truss then passes between the sprayer boxes 12 and 14 to be fully treated with the treating solution, with any excess treating solution being dripped into the supply assembly 22. The treated truss is then discharged onto the roller table 26 for subsequent removal.

More particularly, as best shown in FIGS. 3-11, within each box 12 and 14 are a plurality of spray lines 28 running the full length of the boxes. Each line 28 is fluidly connected to an array of spray heads 30 that spray the treating solution onto the trusses as they pass between the boxes 12 & 14. A plurality of brushes 32 and baffles 33 (see FIGS. 6 & 7 and 10 & 11) are positioned within the spray boxes 12 and 14, relative to the discharge of the pathway, that wipe away some of the excess treating solution and keep the treating solution from escaping the spray box area, respectively. Preferably, there are five brushes 32 that run the length of each box 12 and 14. A protective screen 35 is mounted inside the bottom box 7 and aligned with the pathway to provide support for the trusses as they are fed along the pathway.

Figure 3:
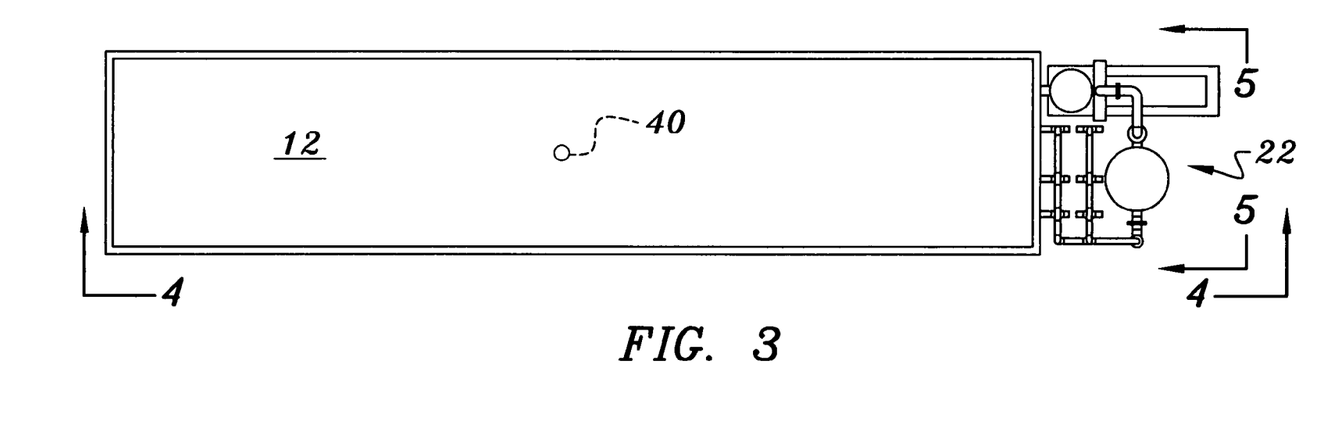
FIG. 3 is a top plan view of the top spray box and the fluid connections thereto.
Figure 4:
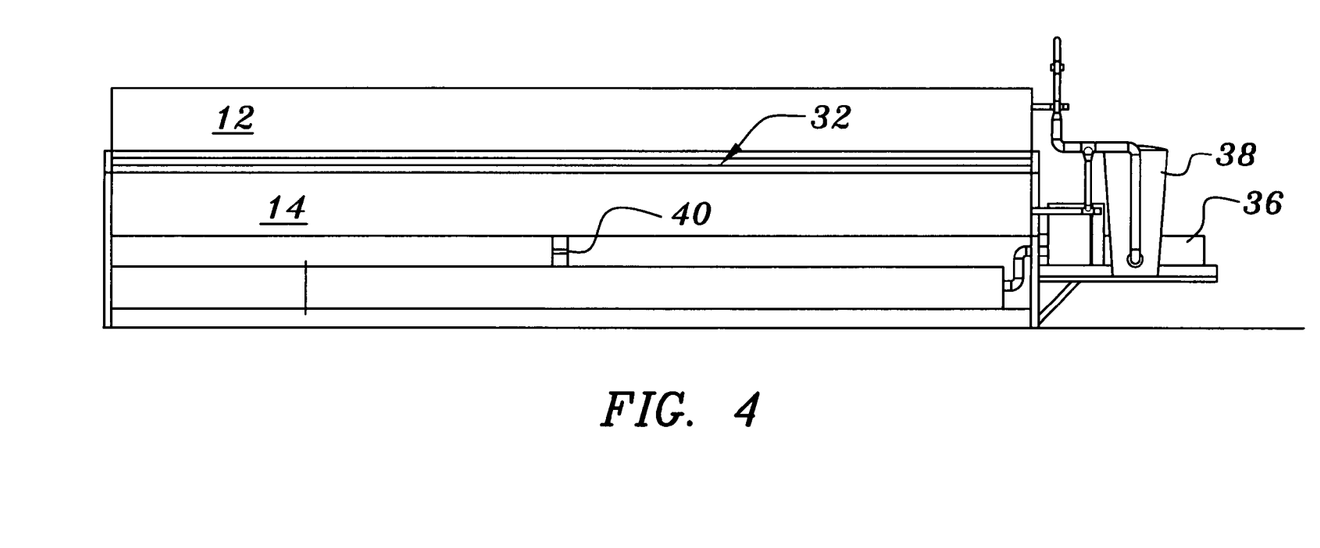
FIG. 4 is a side elevational view of FIG. 3 along lines 4a-4a showing the top and bottom spray boxes and the brushes that wipe away excess treating solution before the trusses exist the spray boxes.
Figure 5:
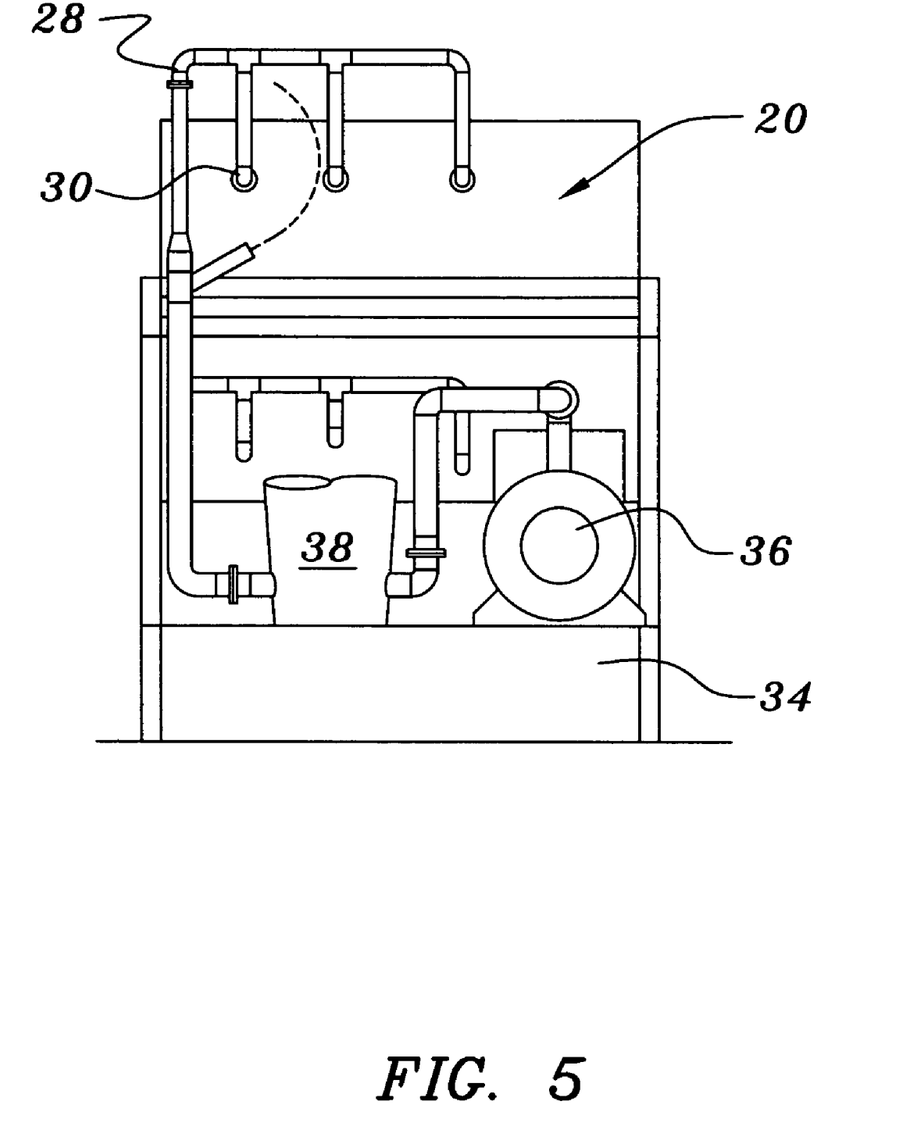
FIG. 5a is an end elevational view of FIG. 3 along lines 5a-5a showing the fluid connections to and from the spray nozzles and tank.

As best shown in FIGS. 3-5, the supply assembly 22 comprises a storage tank 34 positioned under the bottom box 14 on the lower part of the frame 16 and a fluid pump 36 and filter 38 connected in a fluid circuit to pump the treating solution in the tank 34 to the spray heads 30.

Figure 6:
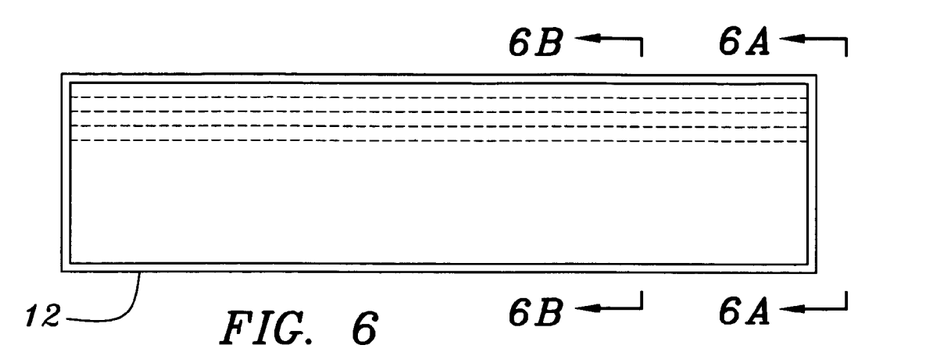
FIG. 6 is a top elevational view of the top spray box.
Figure 6A:
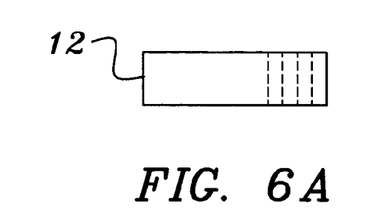
FIG. 6A is an end elevational view of the top spray box along lines 6A-6A of FIG. 6.
Figure 6B:
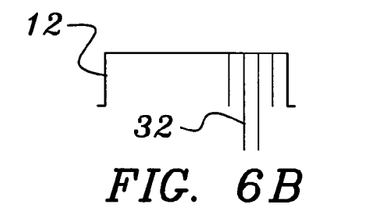
FIG. 6B is a cross-sectional views of the top spray box along lines 6B-6B of FIG. 6 showing the placement of the screen brushes therein.
Figure 7:
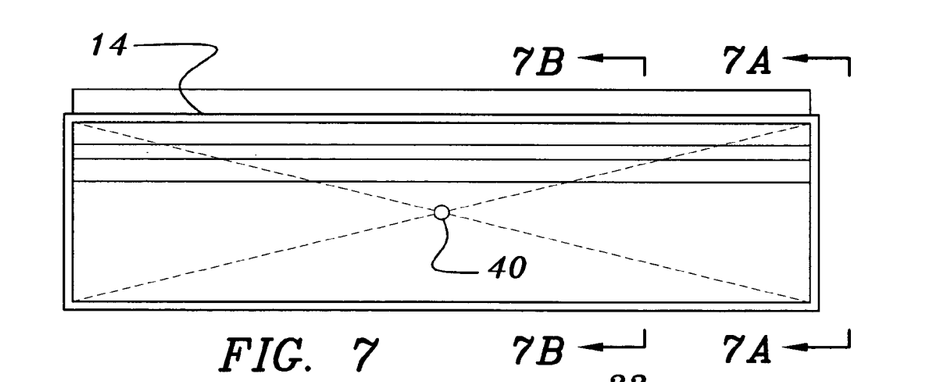
FIG. 7 is a top elevational view of the bottom spray box.
Figure 7A:
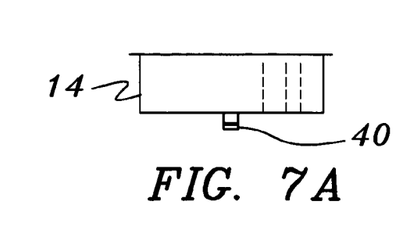
FIG. 7A is an end elevational view of the bottom spray box along lines 7A-7A of FIG. 7.
Figure 7B:
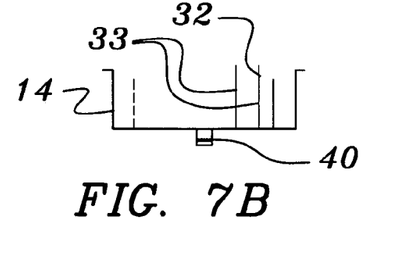
FIG. 7B is a cross-sectional views of the bottom spray box along lines 7B-7B of FIG. 7 showing the placement of the screen brushes therein.
Figure 8:
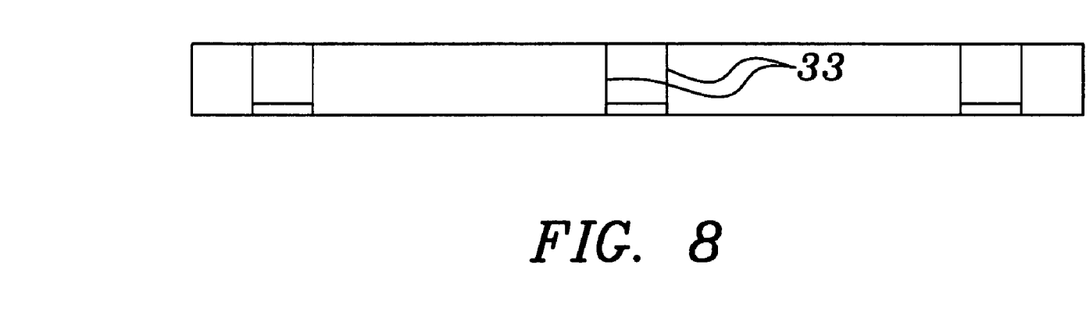
FIG. 8 is a side view of the baffles.
Figure 9:
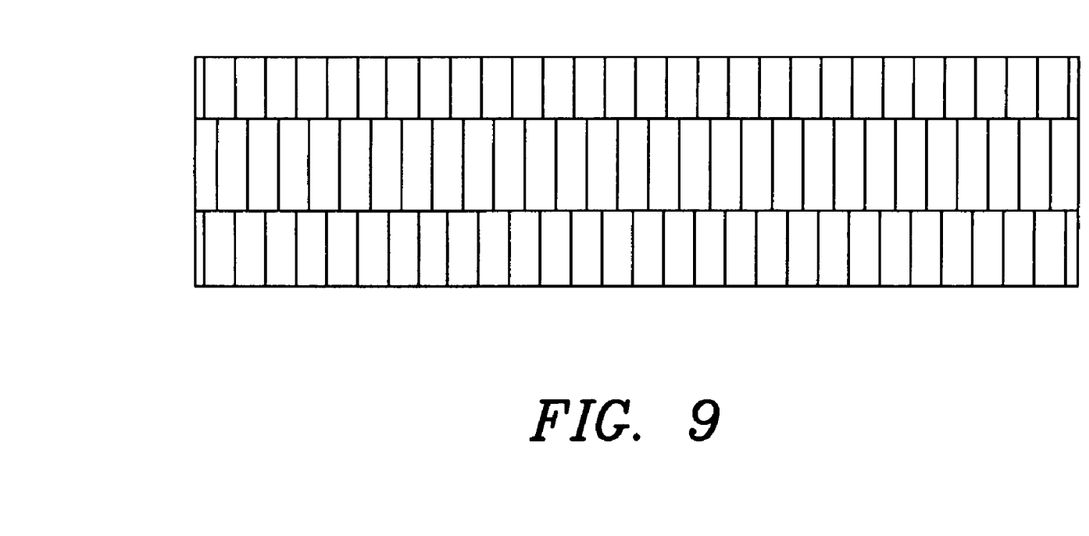
FIG. 9 is a top plan view of the grating system that prevents smaller trusses from falling into the spray box and a large truss from becoming jammed.
Figure 10:
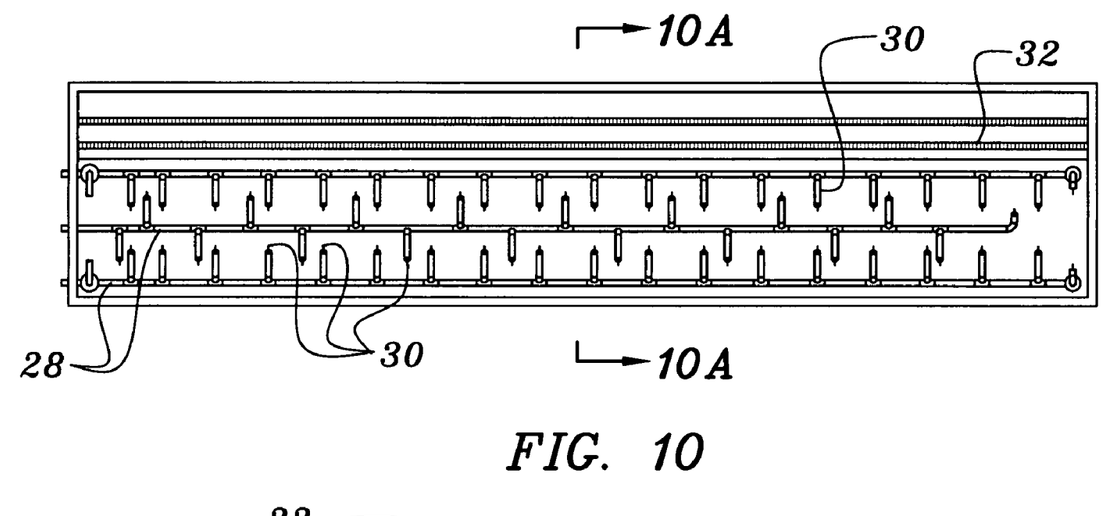
FIG. 10 is an inside view of the bottom spray box.
Figure 10A:
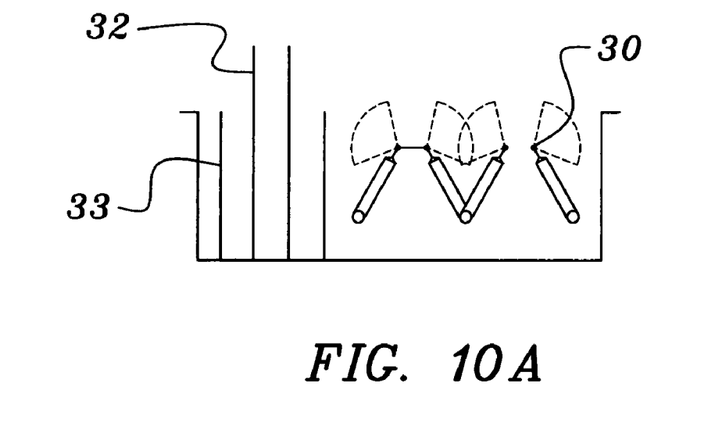
FIG. 10A is a cross sectional view of FIG. 10 along lines 10A-10A.
Figure 11:
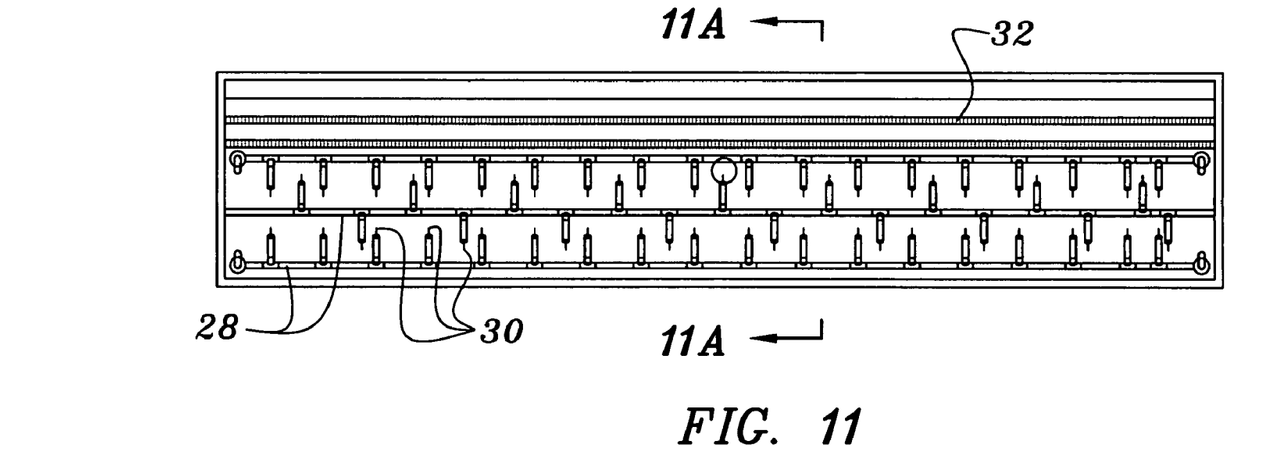
FIG. 11 is an inside view of the top spray box.
Figure 11A:
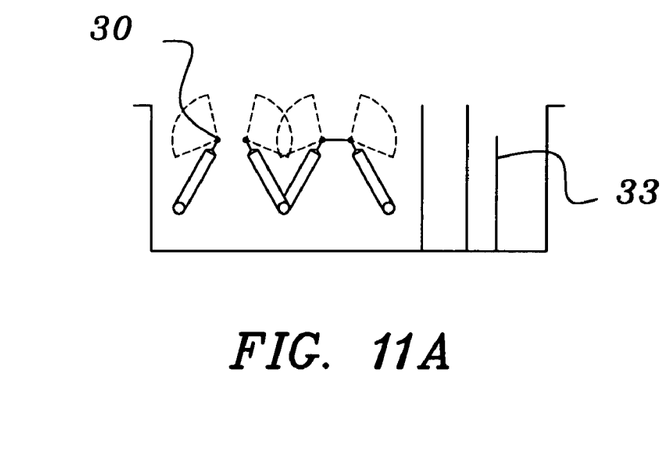
FIG. 11A is a cross-sectional view of FIG. 11 along lines 11A-11A.

As best shown in FIGS. 6-7, the boxes 12 and 14 are configured such that as the treating solution is sprayed onto the trusses, excess treating solution is wiped therefrom by means of the brushes 32. Excess treating solution accumulates in the lower spray box 14 whereupon it flows into the tank 34 via drain 40 to be recirculated.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A spray box assembly, comprising in combination:
   a top spray box;
   a bottom spray box;
   said top and bottom boxes being juxtapositioned to define a pathway therebetween;
   at least one spray assembly positioned within at least one of said top and bottom boxes;
   a supply assembly for supplying a treating solution to said at least one spray assembly to coat product with the treating solution as the product is fed through the pathway wherein the product to be treated comprises wood trusses; and
   a roller press aligned with the input of the pathway for pressing assembly brackets into the joints of the wood trusses before passing into the pathway.

2. The spray box as set forth in claim 1, further including a roller table is aligned with discharge of the pathway for receiving the trusses being discharged from the pathway.

3. The spray box as set forth in claim 1, wherein both said top and bottom boxes contain the at least one of said spray assembly and wherein said spray assembly each comprises a plurality of spray lines extending a significant length of the top and bottom boxes.

4. The spray box as set forth in claim 3, further including an array of spray heads fluidly connected to said plurality of spray lines.

5. The spray box as set forth in claim 1, further including a plurality of brushes positioned within at least one of the top and bottom spray boxes to wipe excess treating solution from the product being treated.

6. The spray box as set forth in claim 1, wherein said supply assembly comprises a storage tank and a fluid pump connected in a fluid circuit to pump the treating solution in said storage tank to spray heads.

7. A spray box assembly, comprising in combination:
- a top spray box;
- a bottom spray box;
- said top and bottom boxes being juxtapositioned to define a pathway therebetween;
- at least one spray assembly positioned within at least one of said top and bottom boxes;
- a supply assembly for supplying a treating solution to said at least one spray assembly to coat product with the treating solution as the product is fed through the pathway;
- a plurality of brushes positioned within at least one of the spray boxes to wipe excess treating solution from the product being treated, said plurality of brushes being positioned on the discharge side of the spray top and bottom boxes.

8. The spray box as set forth in claim 6, wherein said bottom spray box comprises a drain connected in fluid communication with said supply assembly to drain excess treating solution accumulating therein into the tank.

9. The spray box as set forth in claim 6, wherein said supply assembly further comprises a filter.

* * * * *